United States Patent
Lonsway et al.

(10) Patent No.: US 8,333,287 B2
(45) Date of Patent: Dec. 18, 2012

(54) BOTTLE NECK WITH INTERNAL EMBOSSMENTS AND METHOD MANUFACTURE

(75) Inventors: Michael J. Lonsway, Toledo, OH (US); Bruce A. Becker, Perrysburg, OH (US); Vincent J. Bailey, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 595 days.

(21) Appl. No.: 12/427,169

(22) Filed: Apr. 21, 2009

(65) Prior Publication Data
US 2010/0264107 A1   Oct. 21, 2010

(51) Int. Cl.
*B65D 1/02*        (2006.01)
(52) U.S. Cl. .......................................... 215/40; 220/703
(58) Field of Classification Search .............. 215/40–45, 215/382, 354, 356; 220/669, 673, 703
See application file for complete search history.

(56) References Cited

U.S. PATENT DOCUMENTS

| | | | | |
|---|---|---|---|---|
| 482,682 | A | * | 9/1892 | Heartfield ..................... 215/356 |
| D36,781 | S | | 2/1904 | Blower |
| 763,973 | A | * | 7/1904 | Flynn ............................ 222/572 |
| 868,914 | A | * | 10/1907 | Dawson ........................ 215/356 |
| 1,024,894 | A | * | 4/1912 | Heinemann ................... 215/356 |
| 1,832,806 | A | * | 11/1931 | Dawson ........................... 215/43 |
| 2,006,041 | A | | 6/1935 | Darling |
| 2,026,304 | A | | 12/1935 | Deady |
| 2,064,042 | A | * | 12/1936 | Von Till ......................... 222/562 |
| D155,868 | S | | 12/1948 | Braun |
| 2,609,955 | A | * | 9/1952 | Moore ........................... 215/354 |
| 3,468,648 | A | | 9/1969 | Nowak |
| 3,792,988 | A | | 2/1974 | Nowak et al. |
| 3,837,535 | A | * | 9/1974 | Gerk ............................. 222/143 |
| 3,944,104 | A | * | 3/1976 | Watson et al. ................ 215/307 |
| 3,956,441 | A | | 5/1976 | Uhlig |
| 4,105,428 | A | | 8/1978 | Adams |
| 4,170,622 | A | | 10/1979 | Uhlig |
| 4,852,751 | A | * | 8/1989 | Halfacre .......................... 215/43 |
| 5,607,076 | A | * | 3/1997 | Anthony ........................ 220/501 |
| 5,687,862 | A | | 11/1997 | Barbier et al. |
| D406,065 | S | | 2/1999 | Cheng |
| 5,947,310 | A | * | 9/1999 | Wagner ......................... 215/219 |

(Continued)

FOREIGN PATENT DOCUMENTS

DE            13034 c          4/1880

(Continued)

OTHER PUBLICATIONS

"What's New in Glass Might Surprise You" by Lisa McTigue Pierce Food & Drug Packaging / Oct. 2006.

*Primary Examiner* — Sue Weaver

(57) ABSTRACT

A longneck glass or metal bottle of one-piece integrally formed construction has a body with a closed base and a shoulder at an end of the body remote from the base, and a neck extending from the shoulder along an axis and terminating in a neck finish for attachment of a closure. The bottle neck includes at least one internal embossment for affecting flow of liquid from the body through the neck. In exemplary embodiments of the disclosure, the at least one internal embossment includes at least one internal annular rib or at least one internal rib coplanar with the neck axis or at least one internal spiral rib or at least one internal elliptical rib.

6 Claims, 5 Drawing Sheets

U.S. PATENT DOCUMENTS

| | | | |
|---|---|---|---|
| 6,102,225 A | 8/2000 | Lynn | |
| 6,216,897 B1 * | 4/2001 | Wagner | 215/44 |
| 6,405,887 B1 * | 6/2002 | Cargile | 215/379 |
| 7,798,357 B2 * | 9/2010 | Hanafusa et al. | 220/288 |
| 2003/0019830 A1 * | 1/2003 | Garcia-Cuenca et al. | 215/355 |
| 2003/0168372 A1 | 9/2003 | Headen et al. | |
| 2004/0182047 A1 | 9/2004 | Thierjung et al. | |
| 2007/0125720 A1 | 6/2007 | Stecca | |
| 2007/0267422 A1 * | 11/2007 | Barducci | 220/608 |
| 2008/0290101 A1 * | 11/2008 | Stecca | 220/703 |
| 2009/0084799 A1 | 4/2009 | Mondon | |
| 2012/0031915 A1 | 2/2012 | Hewison | |

FOREIGN PATENT DOCUMENTS

| | | |
|---|---|---|
| DE | 24 59 469 A1 | 11/1975 |
| EP | 0 027 780 | 4/1981 |
| EP | 27780 B1 | 1/1985 |
| EP | 0 909 711 A2 | 4/1999 |
| EP | 0 667 300 B1 | 6/1999 |
| FR | 331 391 | 4/1903 |
| FR | 920 663 | 4/1947 |
| FR | 1 246 454 | 1/1960 |
| FR | 2 795 714 | 1/2001 |
| FR | 2881421 A1 | 8/2006 |
| JP | 360145918 A | 8/1985 |
| JP | 2001-322161 | 11/2001 |
| JP | 2007-8536 | 1/2007 |
| KR | 20-0255577 | 12/2001 |
| KR | 10-0906227 | 7/2009 |
| KR | 10-0916631 | 9/2009 |
| WO | WO 92/12901 * | 8/1992 |
| WO | WO 01/58777 | 8/2001 |
| WO | WO 2005/120306 | 12/2005 |
| WO | WO 2010/064749 | 6/2010 |

* cited by examiner

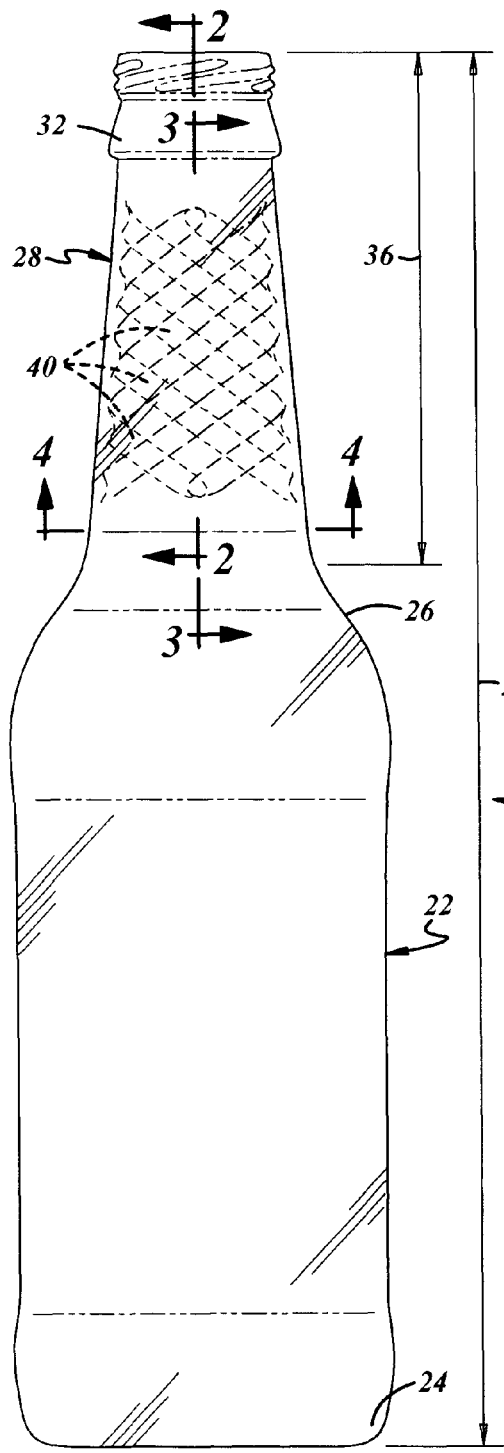
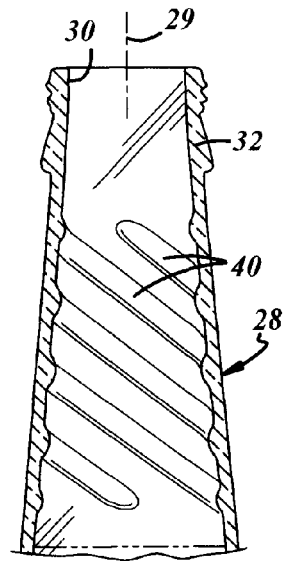
FIG. 2
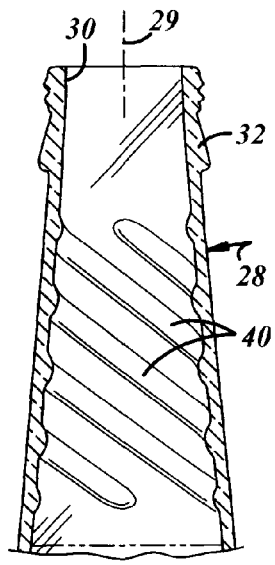
FIG. 3
FIG. 1
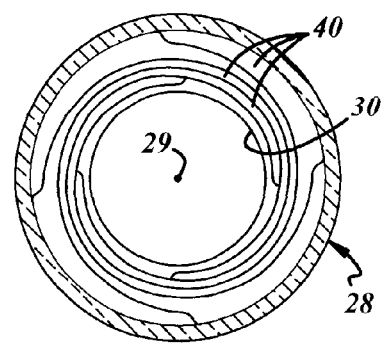
FIG. 4

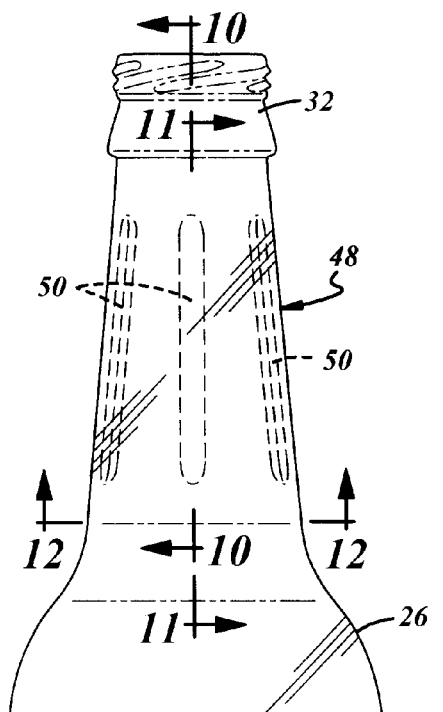
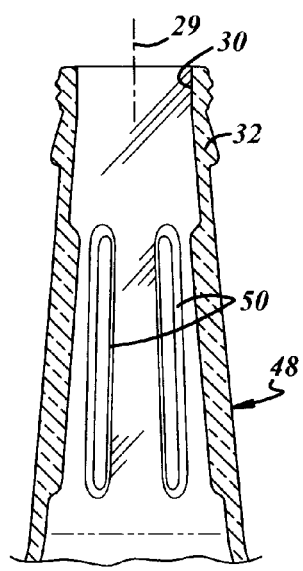
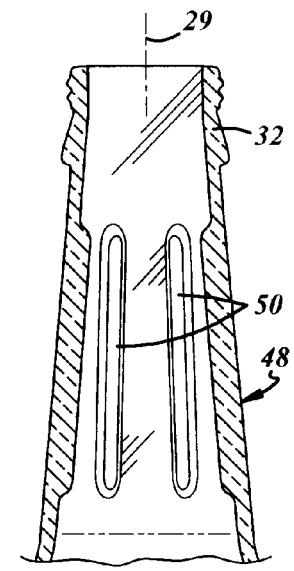
FIG. 10  FIG. 11
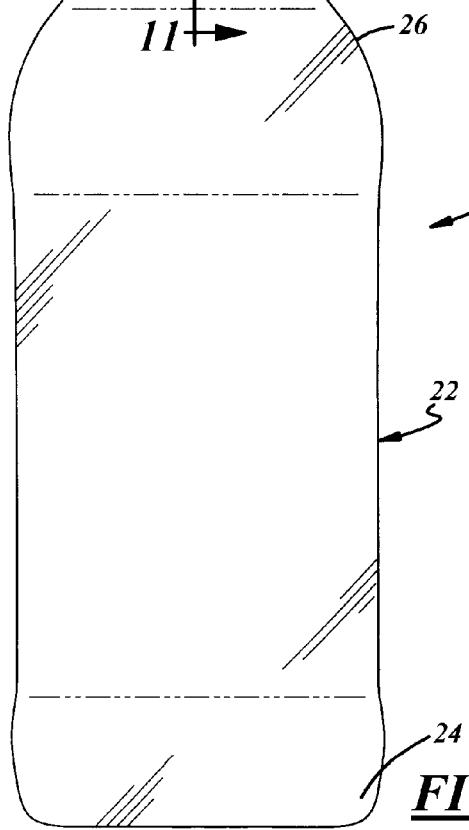
FIG. 9
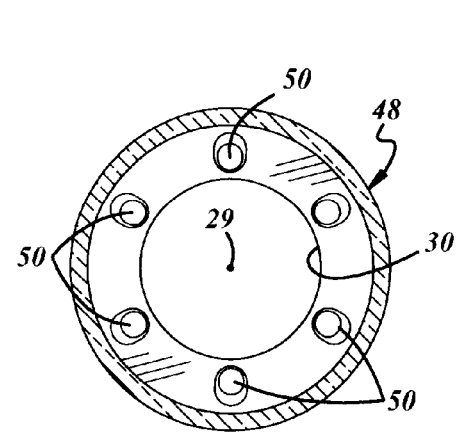
FIG. 12

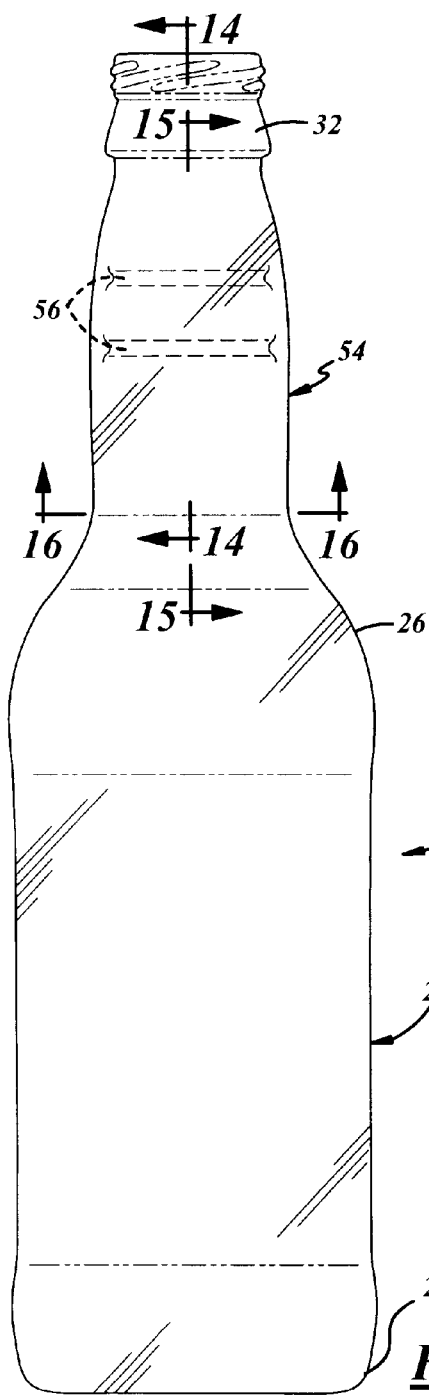
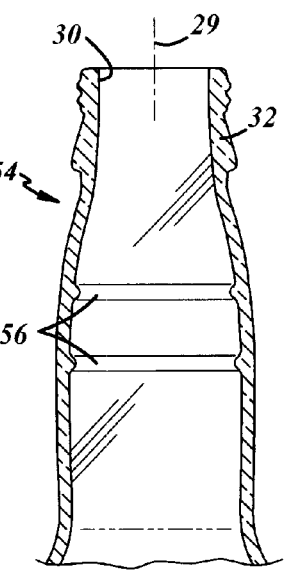
FIG. 14
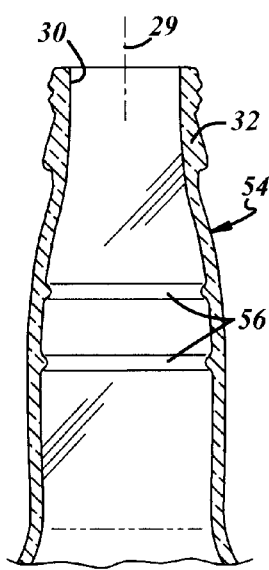
FIG. 15
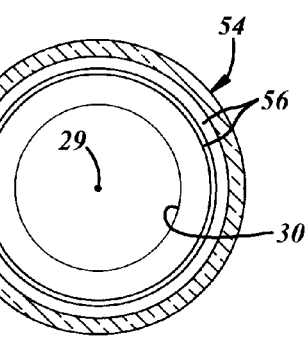
FIG. 16
FIG. 13

BOTTLE NECK WITH INTERNAL EMBOSSMENTS AND METHOD MANUFACTURE

The present disclosure relates to manufacture of longneck bottles having at least one internal embossment on the bottle neck for affecting flow of fluid during dispensing through the bottle neck.

BACKGROUND AND SUMMARY OF THE DISCLOSURE

Longneck bottles are popular in the beverage packaging industry, particularly for packaging beer. A general object of the present disclosure is to provide a longneck bottle having at least one internal embossment in the bottle neck for affecting flow of fluid during dispensing through the bottle neck.

The present disclosure embodies a number of aspects that can be implemented separately from or in combination with each other.

A longneck bottle of one-piece integrally formed glass or metal construction, in accordance with one aspect of the present disclosure, has a body with a closed base and a shoulder at an end of the body remote from the base, and a neck extending from the shoulder along an axis and terminating in a neck finish for attachment of a closure. The bottle neck includes at least one internal embossment for affecting flow of liquid from the body through the neck. In exemplary embodiments of the disclosure, the at least one internal embossment includes at least one internal annular rib or at least one internal rib coplanar with the neck axis or at least one internal spiral rib or at least one internal elliptical rib.

A method of making a longneck bottle, in accordance with another aspect of the present disclosure, includes forming a parison or preform and blowing the parison into a longneck bottle. During formation of the parison and/or blowing of the parison into a longneck bottle, at least one internal rib is formed on the neck of the bottle. The at least one internal rib may be formed by forming an external rib on the neck during the parison-forming operation and pushing the external rib into the neck during the blowing operation. In another exemplary embodiment, the at least one internal rib is formed by forming at least one external channel in the neck and a corresponding internal rib in the neck during the parison forming and/or the bottle blowing operation.

BRIEF DESCRIPTION OF THE DRAWINGS

The disclosure, together with additional objects, features, advantages and aspects thereof, will best be understood from the following description, the appended claims and the accompanying drawings, in which:

FIG. 1 is an elevational view of a longneck bottle in accordance with an exemplary embodiment of the present disclosure;

FIGS. 2, 3 and 4 are sectional views taken substantially along the respective lines 2-2, 3-3 and 4-4 in FIG. 1;

FIG. 9 is an elevational view of a longneck bottle in accordance with a third exemplary embodiment of the present disclosure;

FIGS. 10, 11 and 12 are sectional views taken substantially along the respective lines 10-10, 11-11 and 12-12 in FIG. 9;

FIG. 13 is an elevational view of a longneck bottle in accordance with a fourth exemplary embodiment of the present disclosure;

FIGS. 14, 15 and 16 are sectional views taken substantially along the respective lines 14-14, 15-15 and 16-16 in FIG. 13.

DETAILED DESCRIPTION OF PREFERRED EMBODIMENTS

Figures 5, 6, 7, 8:
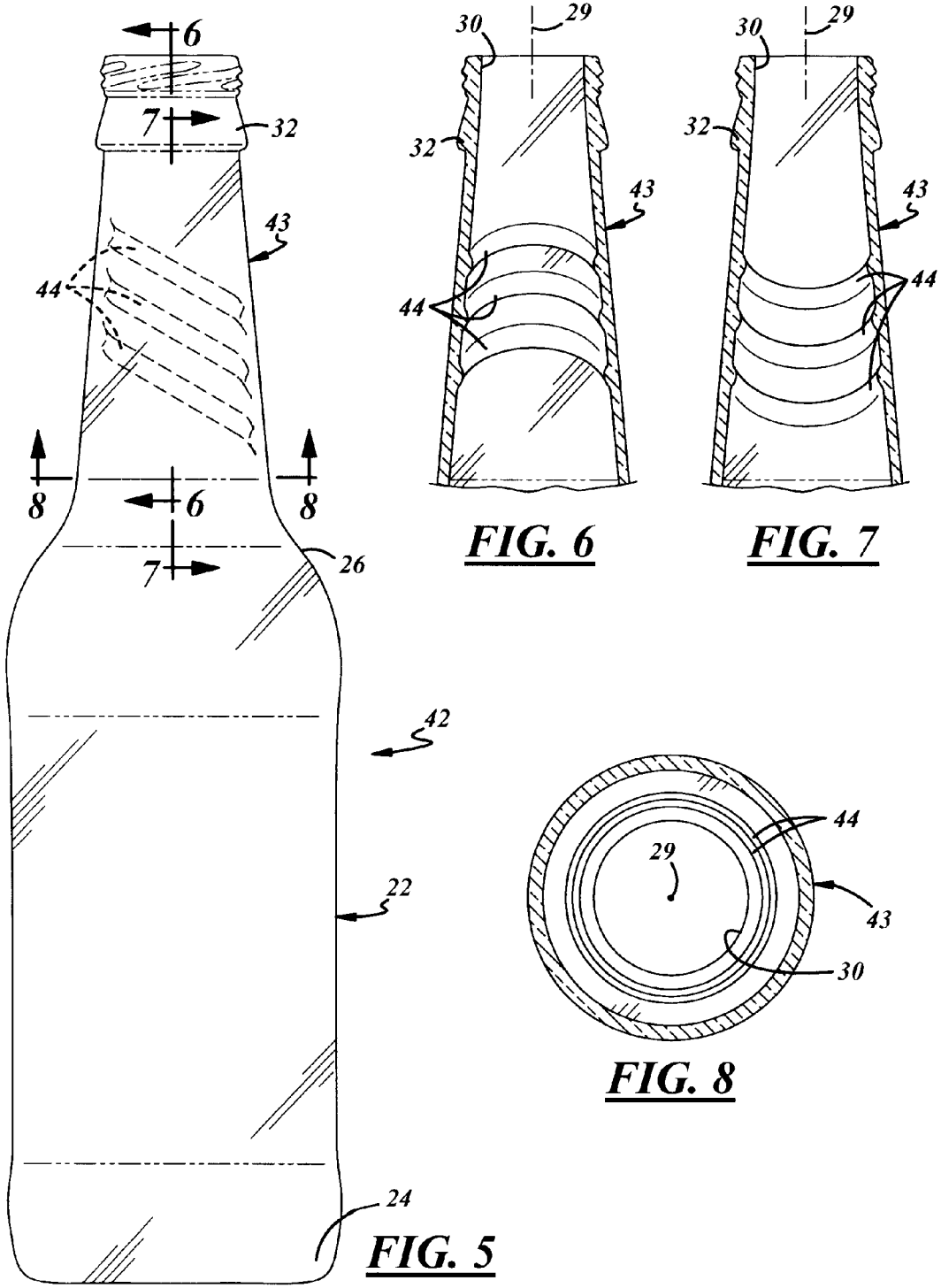
FIG. 5 is an elevational view of a longneck bottle in accordance with another exemplary embodiment of the present disclosure.
FIGS. 6, 7 and 8 are sectional views taken substantially along the respective lines 6-6, 7-7 and 8-8 in FIG. 5.

FIG. 1 illustrates a longneck bottle 20 in accordance with one exemplary embodiment of the present disclosure as including a bottle body 22 having a closed base 24 and a shoulder 26, and a bottle neck 28 extending along an axis 29 from shoulder 26 to a bottle mouth 30 (FIGS. 2 and 3). Neck 28 terminates in a neck finish 32 contoured for attachment of a desired closure. Bottle 20 has an overall height 34, and neck 28 (including neck finish 32) has a height 36. For purposes of the present disclosure, the term "longneck bottle" is defined as a bottle in which the height 36 of the bottle neck is at least 25% of the overall bottle height 34. In exemplary embodiments of the present disclosure, neck height 36 is in the range of 33% to 40% of bottle height 34.

Longneck bottle 20 is of one-piece integrally formed construction, preferably glass or metal construction. (The term "integrally formed construction" does not exclude one-piece integrally molded layered glass constructions of the type disclosed for example in U.S. Pat. No. 4,740,401, or one-piece glass or metal bottles to which other structure is added after the bottle-forming operation.) Longneck glass bottles can be fabricated in a press-and-blow manufacturing operation. A molten glass charge or gob is placed in a blank mold and a plunger is moved into the blank mold to form the molten glass gob against the inside surfaces of the blank mold. The glass preform or parison is then removed from the blank mold and placed in a blow mold, in which the parison body and a major portion of the neck are stretched by blow gas (usually air) against the internal surfaces of the blow mold while the neck finish remains in the geometry formed in the blank mold. Longneck glass bottles also can be formed in a blow-and-blow manufacturing operation. Longneck metal bottles can be formed by any suitable technique.

In accordance with the present disclosure, at least one internal feature or embossment is formed on bottle neck 28 for affecting flow of liquid through the bottle neck during dispensing. In the embodiment of FIGS. 1-4, such internal feature or embossment takes the form of a plurality of internal ribs 40 that spiral around axis 29, which preferably is coaxial with body 22 and forms the central axis of the bottle. Spiral ribs 40 preferably are substantially identical and at uniform angular spacing from each other. As liquid product, such as beer, soda or other beverage, is dispensed from bottle 22, spiral internal ribs 40 impart a swirling action to the liquid.

FIGS. 5-8 illustrate a longneck bottle 42 in accordance with a second exemplary embodiment of the present disclosure. Elements in bottle 42 (and in the bottles of FIGS. 9-17) that are the same or substantially the same as elements in bottle 20 of FIGS. 1-4 are indicated by correspondingly identical reference numerals. In bottle 42, the internal embossments or ribs on bottle neck 43 take the form of closed elliptical ribs 44. Each elliptical rib 44 preferably is disposed in a plane at an angle to axis 29. There are three elliptical ribs 44 in the exemplary embodiment of FIGS. 5-8. Elliptical ribs 44 preferably are in spaced parallel planes at an angle to the axis 29 of the bottle. As liquid beverage is dispensed from bottle 42, passage over ribs 44 tends to agitate the liquid, and release gas from the liquid helping to form a head in beer, or to aerate wine for example.

FIGS. 9-11 illustrate a longneck bottle 46 in which the internal embossments on neck 48 take the form of angularly spaced longitudinal ribs 50. Each rib 50 is coplanar with axis 29. In the example of FIGS. 9-12 in which neck 48 is substantially conical, each rib 50 is linear and at an angle to axis 29. If neck 48 were of the "bulged" configuration of FIG. 13, longitudinal ribs 50 would be curved but still coplanar with axis 29. Ribs 50 extend in the direction of the bottle neck—i.e., ribs 50 are not angled to the direction of product flow through the bottle neck. Ribs 50 thus tend to channel product flow and to reduce agitation of product during dispensing.

FIGS. 13-16 illustrate a longneck bottle 52 in accordance with a fourth exemplary embodiment of the present disclosure. Bottle 52 has a neck 54 that is of exemplary bulged geometry, as compared with the more conical geometries of bottle necks 28, 43 and 48 in FIGS. 1-12. The internal embossments in bottle 52 include at least one annular internal rib 56 disposed in a plane perpendicular to the longitudinal axis 29 of neck 54. In the example of FIGS. 13-16, there are a pair of axially spaced internal ribs 56 in parallel planes on the inside surface of neck 54. Ribs 56 tend to agitate product as the product is dispensed through the bottle neck, releasing gas and tending to form a head in beer for example.

Figure 17:
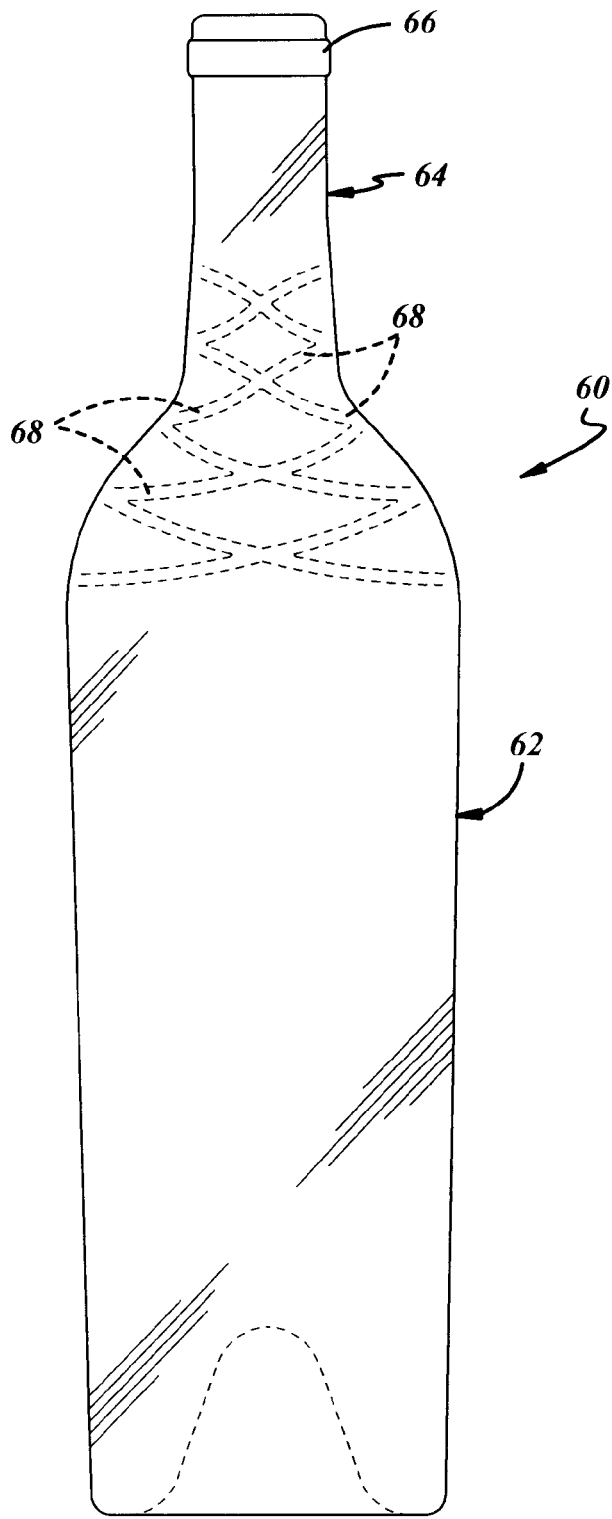
FIGS. 17 and 18 are elevational views of longneck bottles in accordance with respective further exemplary embodiments of the disclosure.

FIG. 17 illustrates a longneck wine bottle 60 having a body 62 and a neck 64 with a cork-type finish 66. Spiral ribs 68 are formed on the inside surface of neck 64. FIG. 17 also illustrates that the internal embossments in the bottle neck are not necessarily confined to the neck but can extend into the body 62 of the bottle.

A longneck bottle may be made by forming a preform or parison, such as in a plunger-type pressing operation although a blowing operation could be employed. The parison is then moved from the parison or blank mold to a blow mold in which the bottle neck and body are formed in a blowing operation. The bottle neck finish 32 or 66 typically is formed to final geometry in the parison-forming operation, while the bottle neck and the bottle body are reformed in the blowing operation. The exemplary embodiments illustrated in the drawings include screw thread-type neck finishes 32 for attachment of threaded closures. However, the neck finish could be of any suitable geometry, such as a crown finish geometry for crimp-attachment of a bottle cap or a cork-type finish 66.

The internal embossments on the bottle neck that characterize the present disclosure could be formed in any suitable operation. In one exemplary implementation of the present disclosure, the internal neck embossments are formed in accordance with the disclosure of U.S. application Ser. No. 11/904,437 filed Sep. 27, 2007, the disclosure of which is incorporated herein by reference. Briefly stated, the blank mold body has an internal surface with at least one debossment or pocket of predetermined geometry (a rib-shaped geometry in the present disclosure) corresponding to the geometry of the desired internal embossment on the bottle neck. The neck portion of the parison is pushed against the internal surface of the blank mold body forming at least one external embossment on the neck portion of the parison corresponding to the at least one internal debossment on the mold body internal surface. When the parison subsequently is blown against the internal surface of the blow mold, the external embossment on the parison neck is effectively pushed through the wall of the neck to form at least one internal embossment corresponding to the external embossment on the parison. Forming at least one internal embossment, preferably but not necessarily rib-shaped on the bottle neck in accordance with the present disclosure, does not preclude also forming internal functional and/or ornamental embossments on the bottle body.

Figure 18:
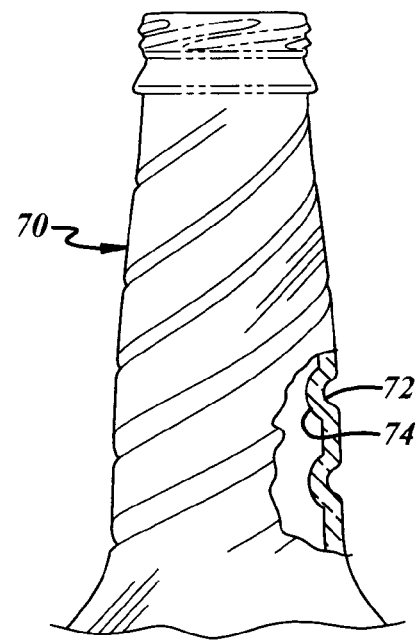

As an alternative method of manufacture illustrated in FIG. 18, the at least one internal embossment on the bottle neck 70 in accordance with the present disclosure could be made by forming at least one external channel 72 on the bottle neck and a corresponding internal rib 74 on the neck during the parison-forming or the operation in which a bottle is blown from the parison. If the external channel and corresponding internal rib are formed during the parison-forming operation, the external channel will tend to disappear during the bottle blowing operation.

As clearly shown in FIGS. 2-4, the spiral rib embossments or features in the embodiment of FIGS. 1-4 extend inwardly from an inside surface of the bottle neck. The inner edges of these ribs are rounded. The same is true of the embodiment of FIGS. 5-8, the embodiment of FIGS. 9-12, the embodiment of FIGS. 13-16 and the embodiment of FIGS. 17-18. As also clearly shown in FIGS. 1-4, the spiral rib embossments or features in this embodiment are disposed around neck 28 well below the inside surface of finish 32 and where the neck widens between finish 32 and shoulder 26. The same is true in the other embodiments.

In summary, a longneck bottle in accordance with the present disclosure is of one-piece integrally formed construction and has a neck that is at least 25% of the overall height or length of the bottle, preferably at least 33% to 40% of the overall bottle length. The bottle neck has at least one internal embossment for affecting flow of liquid through the bottle neck during dispensing. In the several exemplary embodiments of the disclosure, such internal embossments include spiral ribs (FIGS. 1-4 and 17) for imparting a swirling action to the liquid during dispensing, longitudinal ribs (FIGS. 9-12) for retarding swirling action during dispensing, and elliptical ribs (FIGS. 5-8) or annular ribs (FIGS. 13-16) for agitating the liquid during dispensing.

There thus have been disclosed a longneck bottle and method of manufacture that fully satisfy all of the objects and aims previously set forth. The bottle and method of manufacture have been disclosed in conjunction with several exemplary embodiments, and additional modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A bottle of one-piece integrally formed construction having a body with a closed base and a shoulder at an end of said body remote from said base, and a neck extending from said shoulder along an axis and terminating in a neck finish for attachment of a closure, wherein said neck includes a plurality of angularly spaced internal spiral ribs for affecting flow of liquid from said body through said neck, wherein said neck widens between said finish and said shoulder, and said internal spiral ribs are disposed within said neck where said neck widens and at positions spaced from an internal surface of said finish, and wherein said plurality of angularly spaced internal spiral ribs are disposed entirely within said neck and do not extend onto said shoulder or said body.

2. The bottle set forth in claim 1 wherein said bottle is of glass or metal construction.

3. The bottle set forth in claim 2 wherein said bottle is a longneck bottle.

4. A bottle of one-piece integrally formed glass or metal construction having a body with a closed base and a shoulder at an end of said body remote from said base, and a neck extending from said shoulder along an axis and terminating in a neck finish for attachment of a closure,
- wherein said neck includes a plurality of angularly spaced internal spiral ribs, or a plurality of elliptical ribs disposed in parallel planes that are spaced from each other along said axis and at angles to said axis, for affecting flow of liquid from said body through said neck,
- wherein said neck widens between said finish and said shoulder, and said internal spiral ribs or said plurality of elliptical ribs are disposed entirely within said neck where said neck widens and at positions spaced from an internal surface of said finish and do not extend into said shoulder, and
- wherein said plurality of angularly spaced internal spiral ribs or said plurality of elliptical ribs are disposed entirely within said neck and do not extend onto said shoulder or said body.

5. A bottle of one-piece integrally formed construction having a body with a closed base and a shoulder at one end of said body remote from said base, and a neck extending from said shoulder along an axis terminating in a neck finish for attachment of a closure,
- wherein said neck includes a plurality of spaced internal features for affecting flow of liquid from said body through said neck,
- wherein said neck widens between said finish and said shoulder, and said features are disposed on an inside surface of said neck at positions spaced from an internal surface of said finish, and
- wherein said plurality of spaced internal features are disposed entirely within said neck and do not extend onto said shoulder or said body.

6. The bottle set forth in claim 5 wherein said plurality of spaced features comprise a plurality of angularly spaced internal spiral ribs that extend inwardly from an internal surface of said neck.

* * * * *